United States Patent
Vesin et al.

(10) Patent No.: US 10,048,944 B1
(45) Date of Patent: Aug. 14, 2018

(54) SEAMLESS INTEGRATION OF COMPUTER AND HUMAN GENERATED CODE

(71) Applicant: Alchemy Cloud, Inc., San Francisco, CA (US)

(72) Inventors: Dusko Vesin, Novi Sad (RS); Marko Gacesa, Novi Sad (RS); Nikola Milinkovic, Novi Sad (RS)

(73) Assignee: Alchemy Cloud, Inc., San Francisco, CA (US)

( * ) Notice: Subject to any disclaimer, the term of this patent is extended or adjusted under 35 U.S.C. 154(b) by 0 days.

(21) Appl. No.: 15/668,058

(22) Filed: Aug. 3, 2017

(51) Int. Cl.
*G06F 9/44* (2018.01)
*G06F 8/30* (2018.01)
*G06F 8/71* (2018.01)
*G06F 8/41* (2018.01)
*G06F 8/20* (2018.01)

(52) U.S. Cl.
CPC .................. *G06F 8/30* (2013.01); *G06F 8/20* (2013.01); *G06F 8/41* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 9,921,828 B2* | 3/2018 | Barry | ....................... | G06F 8/30 |
| 2009/0300580 A1* | 12/2009 | Heyhoe | ..................... | G06F 8/71 717/106 |
| 2012/0284684 A1* | 11/2012 | Michaely | ................. | G06F 8/71 717/103 |
| 2017/0083310 A1* | 3/2017 | Barry | ....................... | G06F 8/71 |
| 2017/0235661 A1* | 8/2017 | Liu | ....................... | G06F 11/368 717/106 |

* cited by examiner

*Primary Examiner* — Philip Wang
(74) *Attorney, Agent, or Firm* — Perkins Coie LLP

(57) ABSTRACT

The systems and methods disclosed here allow for repeated use of the code generator, and continued integration and development of computer generated code and human generated code. A version control module creates a generator branch and a development branch, where the generator branch tracks various versions of the computer generated code, and the development branch tracks various versions of code containing the computer generated code along with the human made modifications and/or additions to the code. The version control module automatically integrates a version of the computer generated code with a corresponding version of the code to produce a source code. This process of development and integration can be repeated infinitely many times, and allows for flexible design and/or architecture changes.

20 Claims, 11 Drawing Sheets

```
int m=20;
for (i=0; i<10; i++) {
m=m+10;
}
```

```
int m=20;
for (i=0; i<10; i++) {
m=m+15;
}
```

```
int m=20;
for (i=0; i<10; i++) {
m=m+15;
}
```

*FIG. 7*

SEAMLESS INTEGRATION OF COMPUTER AND HUMAN GENERATED CODE

TECHNICAL FIELD

The present application is related to code generators, and more specifically to methods and systems that seamlessly integrate computer and human generated code.

BACKGROUND

Various code generators in existence today create rigid ways to integrate computer and human generated code. The various code generators fall into three areas: single-use generators, generators with areas for custom code, and generators with inheritance architecture. Single-use generators are typically used in the beginning of a project. If the single-use generator is reused the second time, the subsequent code generation rewrites 100% of the previously written code. Generators with areas for custom code designate code areas in which human code can be inserted. With this rigid approach, changing the design and/or architecture of the code is extremely difficult. Generators with inheritance structures designate specific parts of code which can be inherited in such a way that the behavior of the inherited code can be changed. The primary disadvantage of the generator with inheritance structures is that the design and/or architecture is suboptimal and fixed, and a developer can only make changes in a designated area as defined by the inheritance structures.

SUMMARY

Disclosed here are various systems and methods to allow seamless integration of computer and human generated code, at arbitrary locations in the code, without designated areas for code insertion, and/or inheritance. The systems and methods disclosed here allow for repeated use of the code generator, and continued integration and development of the computer generated code and human generated code. A version control module creates a generator branch and a development branch, where the generator branch tracks various versions of computer generated code, and the development branch tracks various versions of code containing computer generated code along with the human made modifications to the code. The version control module automatically integrates a version of computer generated code with a corresponding version of the code to produce a source code, which can be transformed into a computer program. This process of development and integration can be repeated infinitely many times, and allows for flexible design and/or architecture changes.

BRIEF DESCRIPTION OF THE DRAWINGS

These and other objects, features and characteristics of the present embodiments, will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

FIG. 5 shows a file and the corresponding hash values used in file merging.

FIG. 6 shows a change made to the file, and corresponding change to the unique identifiers.

FIG. 7 shows the change from the development branch integrated with the file from the generator branch.

DETAILED DESCRIPTION

Terminology

Figure 1:
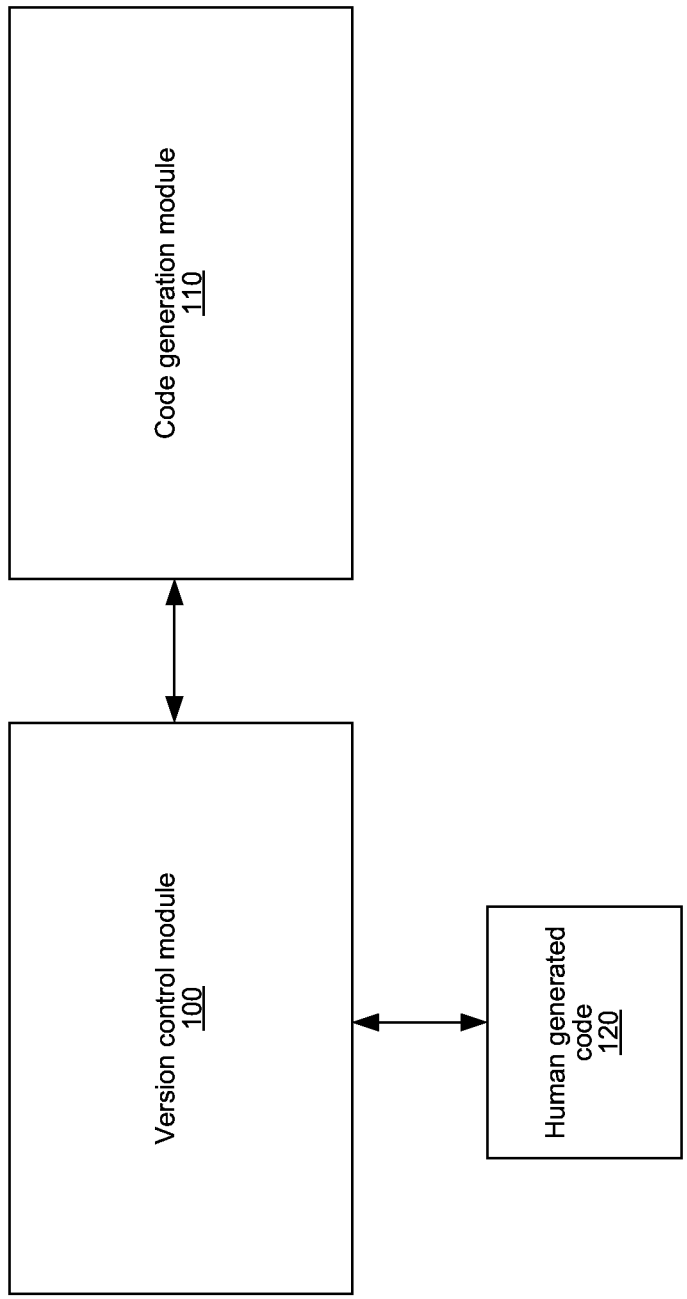
FIG. 1 shows a system to automatically generate a source code.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Code Generator

FIG. 1 shows a system to automatically generate a source code. The system includes a version control module 100 and a code generation module 110. The version control module 100 is a piece of software that provides control over changes to the source code. The version control module 100 can detect changes to a single file, can detect conflicting changes to a single file, and can support multiple parallel development branches.

The version control module 100 takes as input human generated code 120 and code generated by the code generation module 110. The code generation module 110 takes in a specification and produces computer code. The specification is easily understood and written by people and can be formulated in a structured human language such as a structured English language, or can be formulated in a graphical developer interface as a graph, or a flowchart.

The version control module 100 tracks an ordered sequence of computer generated code versions and an ordered sequence of human generated code versions. A human generated code version in the ordered sequence of human generated code versions includes at least human generated code 120. The version control module 100 can automatically integrate the code generated by the code generation module 110 and human generated code 120 into a source code, which can be transformed, e.g., compiled, into a computer program. In some cases, the version control module 100 can require an input from a developer to integrate computer generated code and human generated code 120. The source code is added to the ordered sequence of human generated code versions as the ultimate human generated code version.

Human generated code can be integrated into computer generated code seamlessly, at arbitrary locations. Also, computer generated code can include specific locations where human code can be added, however, human generated code can be added at other locations as well. Further, computer generated code can be overwritten by human generated code through inheritance mechanisms, such as class inheritance mechanisms in object-oriented programming, however, the addition of human generated code is not constrained to only class inheritance mechanisms.

Because the specification for the code generation module can be easily understood and authored by people, and because there are no restrictions on where and how human generated code can be integrated with computer generated code, code development using the system described herein is considerably faster than using traditional code generation systems, or traditional code development systems without code generation. As a result, less computational resources are used in code development, such as processor, memory, and bandwidth are spent on testing code, fixing bugs, and reiterating. Using the system presented here a single developer, on average, can produce 3000 lines of working code in one day. By comparison, developing code in the traditional way, a single developer can produce anywhere from 50 to 300 lines of working code in a single day. Therefore, a developer using the current system is up to 60 times more productive than a developer not using the current system. As a result, using the system described here utilizes as little as $1/60$ of computer processor, computer memory, and computer bandwidth on testing code and debugging.

Additional benefits of the disclosed technology include: ability to add and/or change code in 100% of the code base as opposed to a small fraction of the code base; an ability to generate code and add to the generated code and/or modify the generated code infinitely as opposed to a limited number of times; an ability to run the code generation and merge computer generated code with the human generated code many times a day as opposed to infrequently. Consequently, the disclosed technology requires fewer developers and/or computers.

In addition, the technology disclosed here addresses a long felt but unresolved need to increase productivity of developers, for example, the need to increase the number of working lines of code a developer generates in a single day. Development tools have existed since late 1960s, however developer productivity has remained bounded by 50 to 300 lines of working code per day. Utilizing the technology disclosed here the developer productivity increases to 3000 lines of working code per day. Further, the technology combines ideas from disparate fields of endeavor. Finally, the technology disclosed here produces unexpected results by increasing developer productivity by up to 60 times, whereas at the outset of the development of the technology disclosed here, a more modest increase in productivity of up to 4 times was expected.

Figure 2:
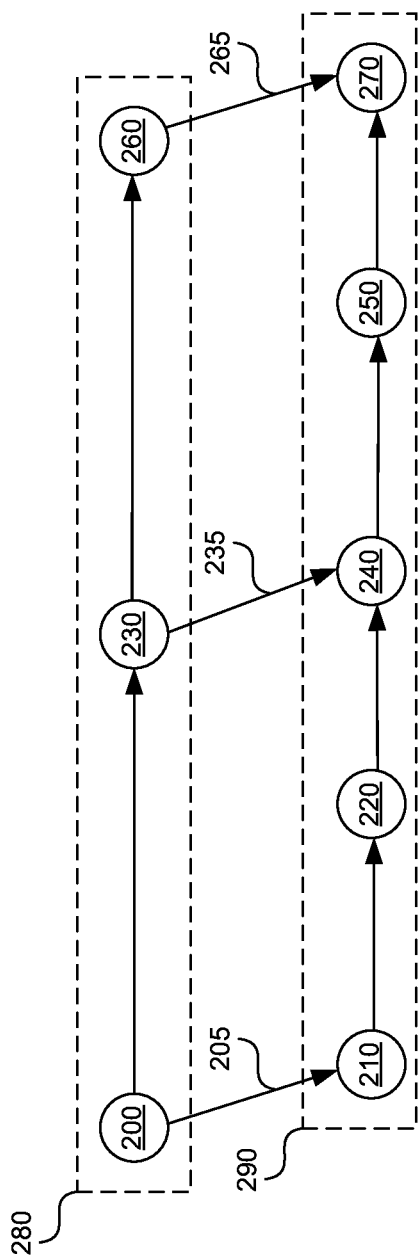
FIG. 2 shows multiple version control branches generated by the version control module.

FIG. 2 shows multiple version control branches generated by the version control module. The version control module 100 in FIG. 1 can create multiple version control branches, such as generator branch 280, and the development branch 290. The generator branch 280 corresponds to computer generated code, while the development branch 290 corresponds to code that is at least in part human generated. The generator branch 280 includes an ordered sequence of computer generated code versions 200, 230, and 260. The development branch 290 includes an ordered sequence of human generated code versions 210, 220, 240, 250, and 270, all of which can include human generated code.

Version 200 of computer generated code is the initially generated code by the code generation module 110 in FIG. 1. Version 200 is the ultimate computer generated code version of the code generation module branch 280. In step 205, the version control module 100 in FIG. 1 makes an initial push of computer generated code version 200 to the development branch 290 to generate human generated code version 210 on the development branch 290. Human generated code version 210 is the ultimate human generated code version of the development branch 290.

Version 220 of the code contains custom changes added by various developers in the system. Version 230 of computer generated code contains the subsequent, i.e., second, code generation by the code generation module 110 in FIG. 1. Version 230 becomes the new ultimate computer generated code version on the generator branch 280. In step 235 computer generated code version 230 on the generator branch 280 is integrated with the version 220 on the development branch 290. The integrated code is stored as version 240 on the development branch 290. Version 240 becomes the new ultimate human generated code version of the development branch 290.

Version 250 of the code contains more custom changes added by various developers in the system. Version 250 of computer generated code contains the subsequent, i.e., third, code generation by the code generation module 110 in FIG. 1. Version 260 becomes the new ultimate computer generated code version on the generator branch 280. In step 265 the new computer generated code version 260 on the generator branch 280 is integrated with the version 250 on the development branch 290. The integrated code is stored as version 270 on the development branch 290. Version 270 becomes the new ultimate human generated code version of the development branch 290. This process can be repeated ad infinitum. The generator branch 280 and the development branch 290 are shared between, and can be accessed by, various developers.

Figure 3:
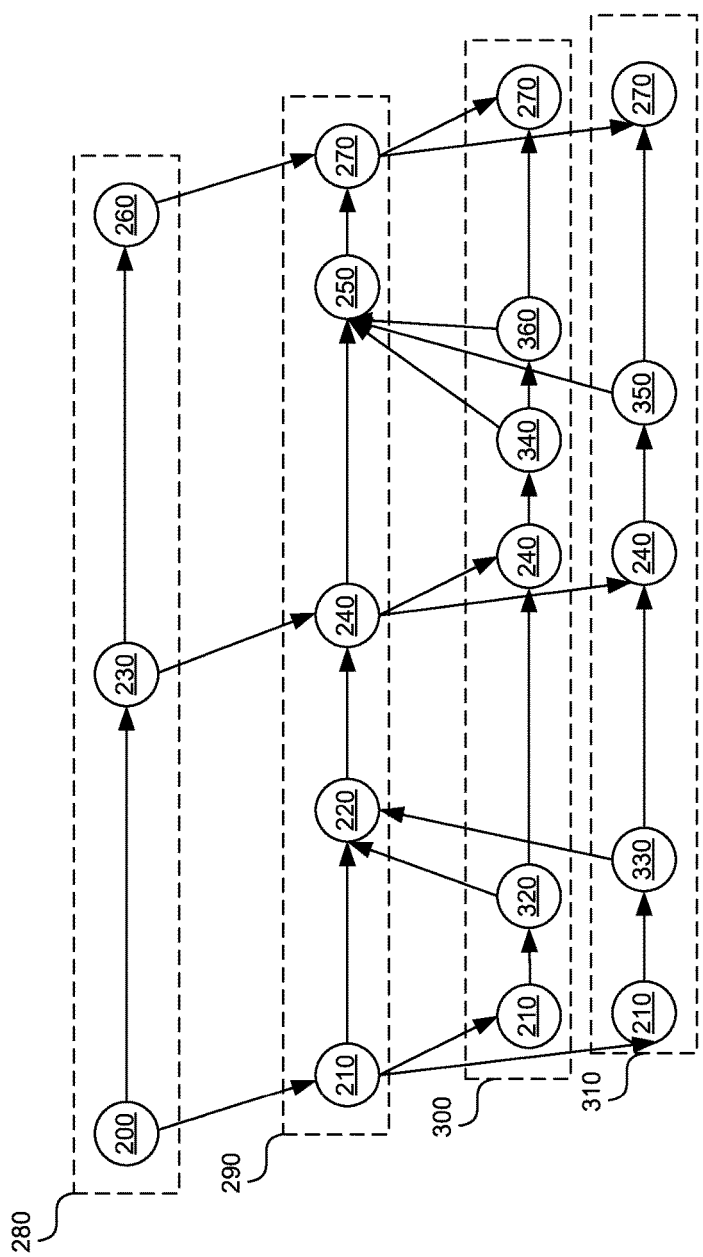
FIG. 3 shows multiple version control branches generated by the version control module, including multiple development branches.

FIG. 3 shows multiple version control branches generated by the version control module, including multiple development branches. The version control module 100 in FIG. 1 can create multiple version control branches such as generator branch 280, and multiple development branches 290, 300, 310. The development branches 300 and 310 can be associated with individual developers, and there can be as many development branches as there are developers.

The development branch 290 includes an ordered sequence of human generated code versions 210, 220, 240, 250, and 270, all of which can include human generated code. The development branch 300 includes an ordered sequence of human generated code versions 210, 320, 240, 340, 360, 270. The development branch 310 includes an ordered sequence of human generated code versions 210, 330, 240, 350, 270.

The version control module 100 in FIG. 1 integrates together the code changes made by individual developers such as 320, 330, into version 220 on the development branch 290. The version control module 100 in FIG. 1 can integrate code from two or more versions into a single code version, such as integrating code from versions 210, 320, 330 into a single code version 220. Similarly, the version control module 100 integrates together code changes 340, 360, and 350 into the version 250 on the development branch 290. The version control module 100 integrates computer generated code from the generator branch 280 with human generated code on the development branch 290, such as integrating version 230 and version 220, into version 240. The version control module 100 propagates version 240 of the integrated code to the development branches 300, 310. Similarly, the version control module 100 integrates computer generated code version 260 with the development branch version 250, into version 270. Then, the version control module 100 propagates version 270 of the integrated code into the development branches 300, 310.

Figure 4:
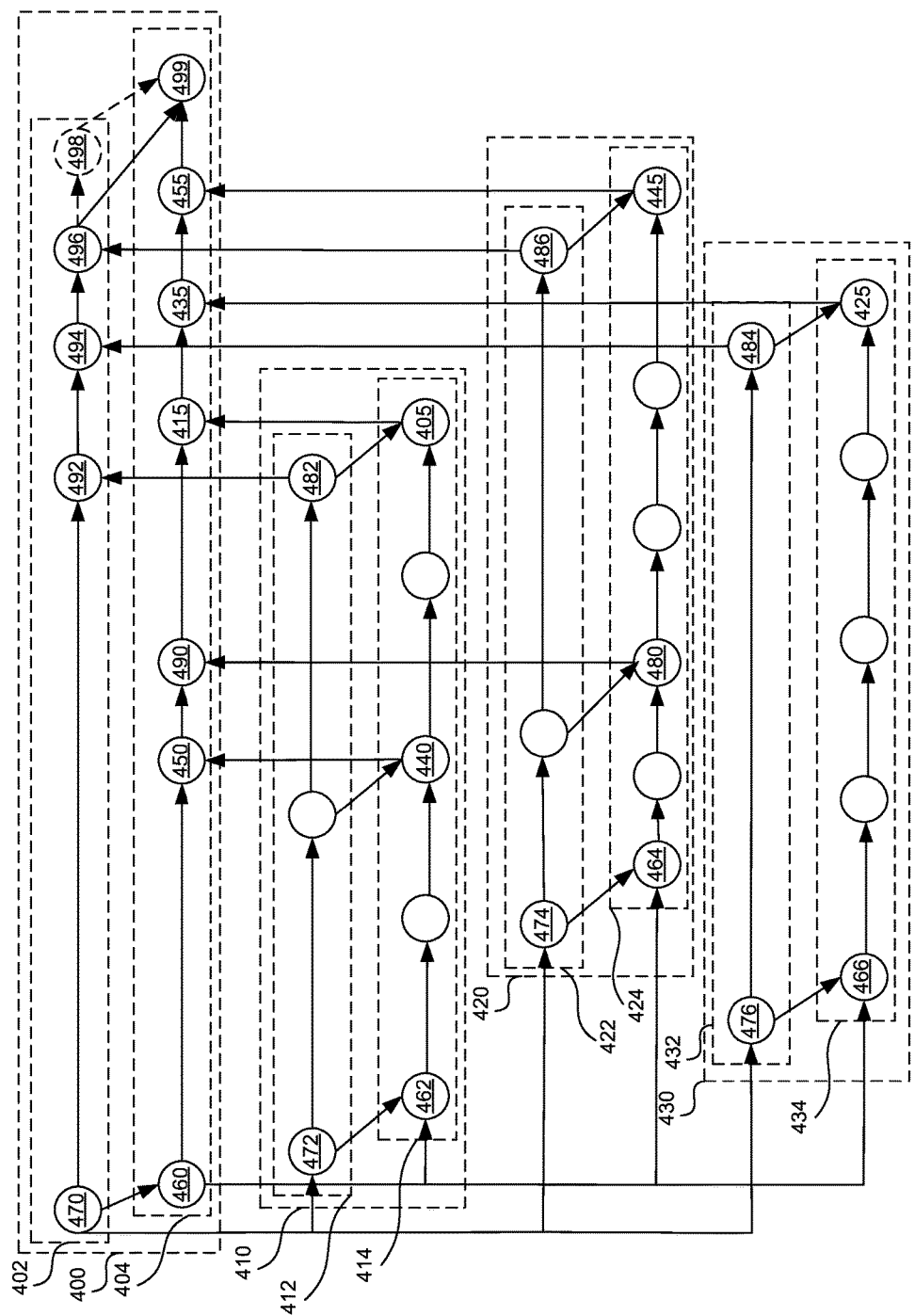
FIG. 4 shows multiple version control branches generated by the version control module, including multiple generator branches and multiple development branches.

FIG. 4 shows multiple version control branches generated by the version control module, including multiple generator branches and multiple development branches. Version control module 100 in FIG. 1 keeps track of multiple version control branches such as the master branch 400, and feature branches 410, 420, 430. Master branch 400 contains two version control branches, one master generator branch 402, and one master development branch 404. Similarly, each feature branch 410, 420, 430 contains two version control branches, one generator branch and one development branch. Specifically, feature branch 410 contains generator branch 412 and development branch 414; feature branch 420 contains generator branch 422, and development branch 424; feature branch 430 contains generator branch 432 and development branch 434. Each feature branch 410, 420, 430 corresponds to a different computer software feature being developed.

Initially, the master generator branch 402 generates an initial computer generated code 470. The version control module 100 propagates the initial code 470 to the master development branch 404 to obtain code version 460. As each of the subsequent feature branches 410, 420, 430 are instantiated, the version control module 100 initializes the generator branches 412, 422, 432 by copying the most up-to-date computer generated code from the master generator branch 402 into the initial computer generated code versions 472, 474, 476. In the present case, the most up-to-date computer generated code from the master generator branch 402 is the initial computer generated code 470.

Similarly, the version control module 100 initializes the development branches 414, 424, 434 by copying the most up-to-date human generated code from the master development branch 404 into the initial human generated code versions 462, 464, 466. In the present case, the most up-to-date human generated code from the master development branch 404 is the initial human generated code 460.

As the code development in the feature branches 410, 420, 430 progresses, the version control module 100 integrates the temporally first integrated human generated code version 440 containing both computer generated code 473 and code 463 into the master development branch 404 to obtain version 450. The version control module 100 integrates each subsequent integrated human generated code version, such as human generated code version 480, 405, 425, 445 into the master development branch 404 versions 490, 415, 435, 455 respectively.

Along with integrating human generated code into the master development branch 404, the version control module 100 integrates the computer generated code versions 482, 484, 486 into the master generator branch 402 versions 492, 494, 496, respectively. In addition, the version control module 100 integrates the code from the master generator branch 402 with the code from the master development branch 404. For example, the version control module can integrate code version 496 from the master generator branch 402 with the code version 455 from the master development branch 404 to obtain code version 499. In another example, the code generator can generate an additional code version 498, and integrate the code version 498 with the code version 455 to obtain code version 499. Code version 499 can be transformed, by, for example, compiling, into a working computer program.

FIG. 5 shows a file and the corresponding hash values used in file merging. The code generation module generates an initial computer generated code 200 in FIG. 2, which includes file 500, containing lines of code 510, 520, 530, 540.

In one embodiment, the version control module 100, instead of computing the unique identifier, can compare contents of the various files to determine differences, and/or can compute multiple unique identifiers to generate the comparison, etc. To compare contents of the various files, the version control module 100 can compare text contained in the various files. Throughout this application, multiple files and multiple segments of files can be compared by comparing contents of the multiple files and the multiple segments, respectively, or by computing unique identifiers and comparing the unique identifiers, as described in this application.

In another embodiment, the version control module 100 in FIG. 1 computes a unique identifier for the whole file 550, and a unique identifier 560, 570, 580, 590 for each line of code 510, 520, 530, 540 respectively. The unique identifier can be a unique numerical value, unique alphanumerical value, etc. The values 550, 560, 570, 580 are based on the text contained in each line of code 510, 520, 530, 540 respectively. The unique identifier 590 for the whole file is based on the text contained in the whole file. For example, the version control module 100 can convert the texts of the whole file into ASCII characters, and combine the ASCII values into a unique identifier for a fast detection of changes. The version control module can use a hashing algorithm to compute unique identifiers 550-590. By having a unique identifier associated with each file, comparison of two files consists of comparing two unique identifiers, as opposed to comparing each file character by character. The unique identifiers can be unique numerical values, which can be quickly compared.

FIG. 6 shows a change made to the file 500 in FIG. 5, and corresponding change to the unique identifiers. In human generated code version 220 in FIG. 2, a custom change is made to line 630 of file 600. Based on the change, the version control module 100 in FIG. 1 computes a new unique identifier 670 corresponding to line 630. Similarly, based on the change, the version control module 100 computes a new unique identifier 650 corresponding to the file 600.

FIG. 7 shows the change from the development branch integrated with the file from the generator branch. In step 235 in FIG. 2, the version control module 100 in FIG. 1 compares the unique identifiers of files associated with the generator branch version 230 in FIG. 2 to the unique identifiers of corresponding files associated with the development branch version 220 in FIG. 2. The correspondence between files on the generator branch 280 and the development branch 290 in FIG. 2 can be established by file identification (ID). Specifically, each file has a file ID associated with it, such as a filename, or an alphanumeric value identifying the file. When the file ID between two files is the same, the two files are considered to be corresponding files, and their unique identifiers are compared for any differences.

For example, the version control module 100 compares the unique identifier 650 of file 600 in FIG. 6 on the development branch 290 in FIG. 2, to unique identifier 550 of file 500 in FIG. 5 on the generator branch 280 in FIG. 2. The two unique identifiers 550 and 650 are different, which signifies that the two files are different. Comparing the unique identifiers 550 and 650 is a faster way to determine differences between two files, then comparing the two files line by line. If there are no differences between the two files, the version control module continues to compare subsequent corresponding files, until all the corresponding files on the generator branch 280 in FIG. 2 and the development branch 290 in FIG. 2 have been compared.

If there are differences between the two files 500 in FIGS. 5 and 600 in FIG. 6, the version control module 100 compares the unique identifiers associated with each line in the two files. Specifically, the version control module 100 in FIG. 1 compares line 510-540 in FIG. 5 with line 610-640 in FIG. 6, respectively. To compare the lines in the two files, the version control module 100 compares the unique identifiers associated with each line of the file. Specifically, the version control module 100 compares unique identifiers 560-590 in FIG. 5 to unique identifiers 660-690 in FIG. 6. In the present case the only difference detected is between values 570 in FIGS. 5 and 670 in FIG. 6, which indicates that the corresponding lines 530 in FIGS. 5 and 630 in FIG. 6 are different.

To determine whether to incorporate line 530 in FIG. 5, or line 630 in FIG. 6 into the version 240 in FIG. 2, the version control module 100 in FIG. 1 compares the ultimate computer generated code version 230 on the generator branch 280 to the penultimate computer generated code version 200 on the generator branch 280 in FIG. 2. Further, the version control module 100 compares the ultimate human generated code version 220 on the development branch 290 in FIG. 2 to the penultimate human generated code version 210 on the development branch 290 in FIG. 2. The version control module 100 finds no differences between computer generated code version 230 and computer generated code version 200 on the code generation module branch 280 in FIG. 2. Instead, the version control module 100 finds that the change is located on the development branch 290 in FIG. 2. Therefore, the version control module 100 integrates the line of code associated with the development branch 290 in FIG. 2, specifically line 630 in FIG. 6. The resulting code is shown in file 700 in FIG. 7.

Figure 8A:
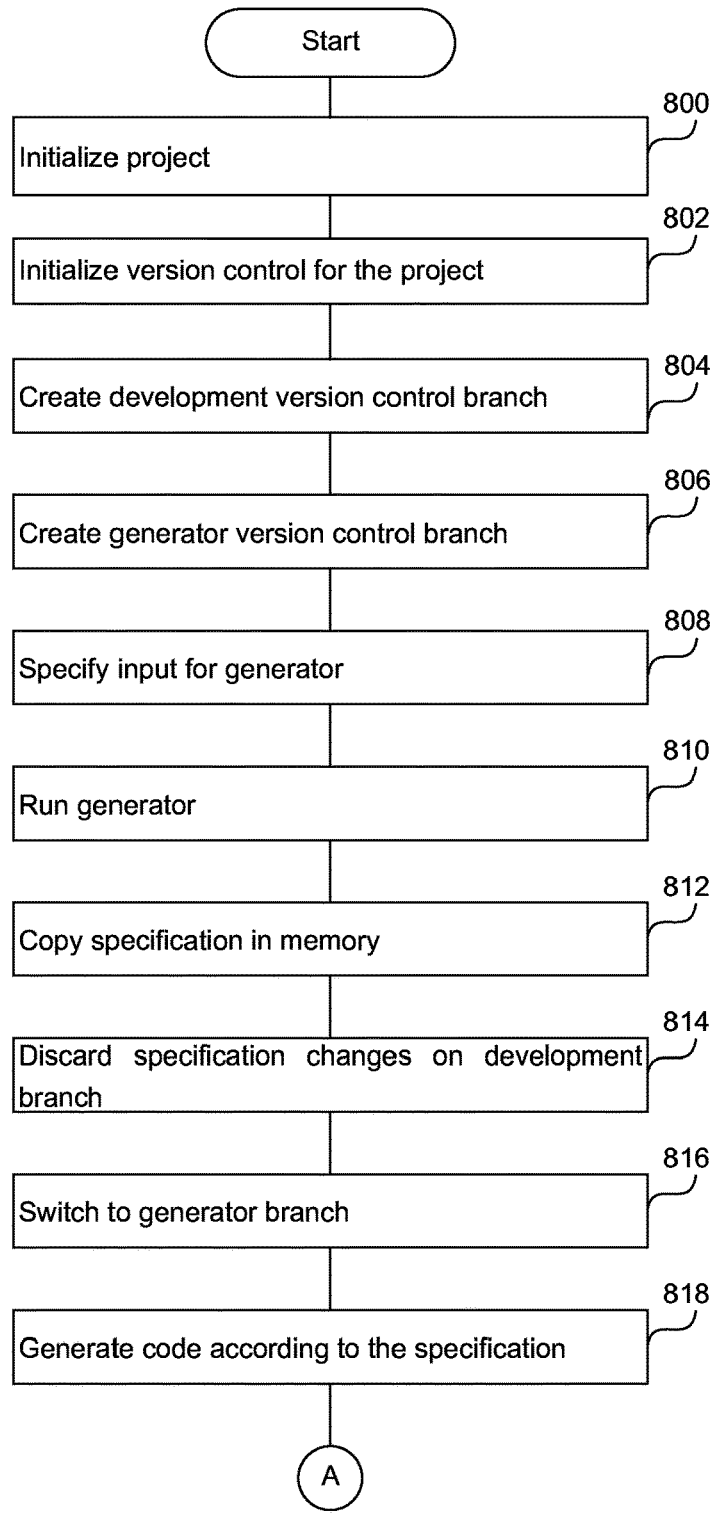
FIGS. 8A-8C are a flowchart of a method to create and manage the generator branch and the development branch.
Figure 8B:
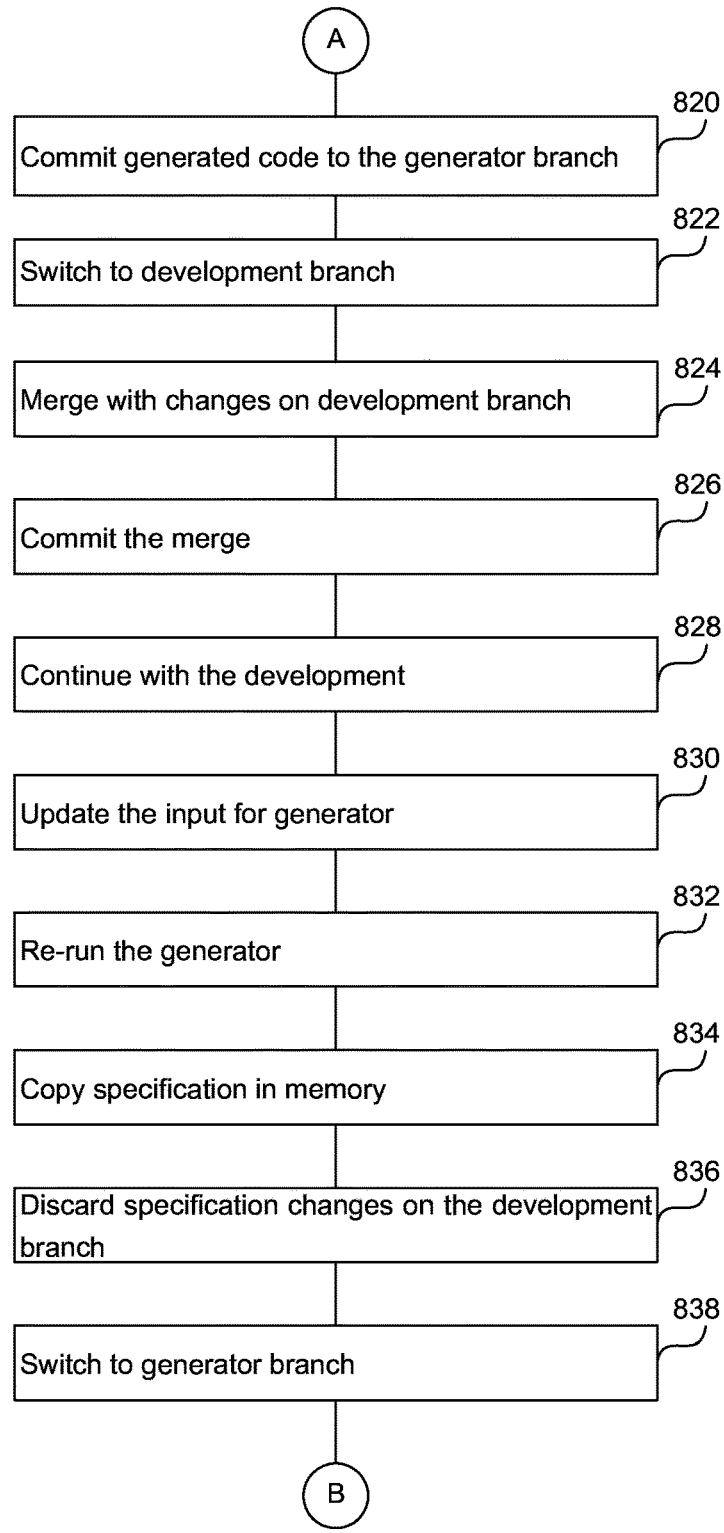
Figure 8C:
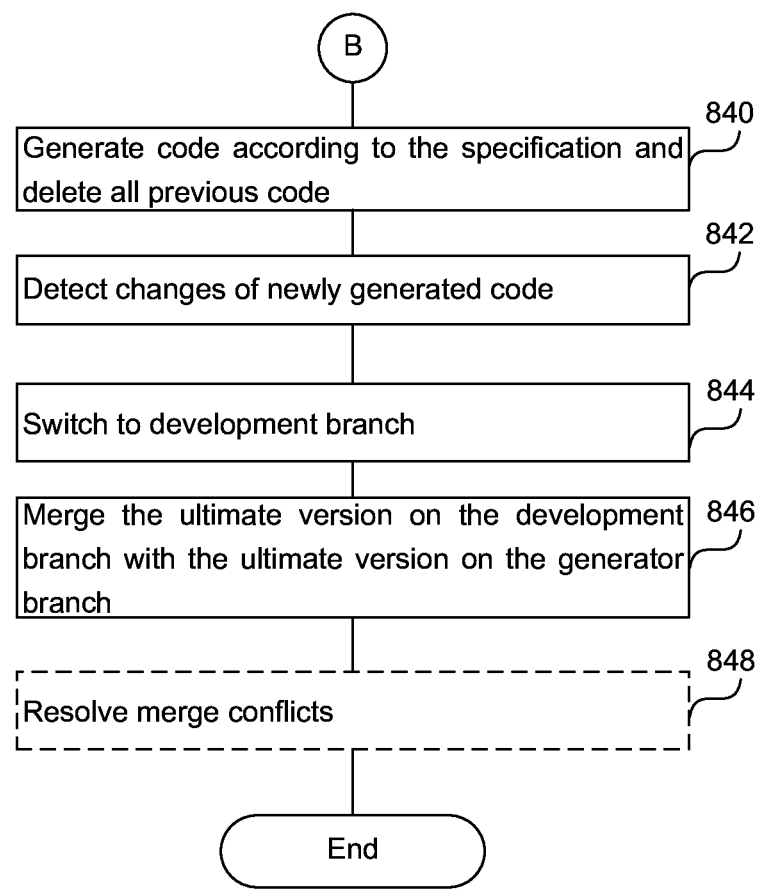

FIGS. 8A-8C are a flowchart of a method to create and manage the generator branch and the development branch. In step, 800 a project is initialized. In step 802, the version control module is initialized on a computer such as a cloud computer, a cloud server, a collection of cloud computers, a desktop computer, a local server, etc. In step 804, the version control module 100 in FIG. 1 creates the development branch, such as branch 280 in FIG. 2. The development branch is used by developers to create new code and to customize generated code.

In step 806, the version control module 100 creates the generator branch, such as branch 280 in FIG. 2. Only the code generation module 110 in FIG. 1 operates in the generator branch 280 in FIG. 2. This way, the code generation module 110 in FIG. 1 is isolated from custom code on the development branch 290 in FIG. 2. Further, using the separate generator branch 280, the version control module 100 can more easily identify differences between human generated code and computer generated code after every code generation module 110 run. Tracking a separate generator branch 280, allows the code generation module 110 to be used repeatedly, without losing custom changes in intermediate steps on the development branch 290, and without sub-optimizing, i.e., simplifying, the code architecture and design because version control module 100 effectively integrates just the changes of human generated code on the development branch 290 and computer generated code on the generator branch 280.

In step 808, input for the generator is specified, such as a specification file written in English, structured English, or other high-level language, or the specification file can be represented visually such as a flowchart of the steps taken by the program. In step 810, the code generation module 110 in FIG. 1 runs. In step 812, the code generation module 110 copies the specification in memory because the code generation module 110 does not operate on the development branch 290 in FIG. 2. In step 814, the version control module 100 discards specification changes on the development branch 290. In step 816, the version control module 100 switches to the generator branch 280.

In step 818, the code generation module 110 generates code according to the received specification. Computer generated code does not contain designated places for customization by human developers, or references to the code generation module 110. Computer generated code is clean code, which can easily be integrated with the rest of the code base. The computer generated code can be watermarked, but the computer generated code can also be clean, without any watermarks, so as to be indistinguishable from the human generated code. In step 820, the version control module 100 commits computer generated code to the generator branch 280. In step 822, the version control module 100 switches to the development branch 290. In step 824, the version control module 100 integrates the ultimate human generated code version on the development branch 290 and the ultimate human generated code version on the generator branch 280, to obtain a new version of code, such as human generated code version 240, 270 in FIG. 2. In step 826, the version control module 100 commits the integrated code to the development branch 290.

In step 828, new versions of human generated code are committed to the development branch 290, such as versions 220, 250 in FIG. 2. Step 828 begins the next coding cycle, where big benefits of the current system are realized, such as using as little as 1.67% (i.e., 1/60) of computer resources necessary for development. In step 830, the input to the generator is updated, such as the specification file. In step 832, the code generation module 110 regenerates the code on the generator branch 280. In step 834, the code generation module 110 copies the specification in memory. In step 836, the version control module 100, discards specification changes on the development branch. In step 838, the version control module 100 switches to the generator branch 280. In step 840, the code generation module 110 generates code according to the specification and deletes all previous code.

In step 842, the version control module 100 detects only changes of newly generated code, and compares them to the ultimate version of the generated code, such as version 200, on the generator branch 280. The version control module 100 does not notice that files were deleted and re-entered on the generator branch 280. The version control module 100 only notices changes between the newly generated code and the ultimate version of the generated code, such as version 200. The version control module 100 can automatically integrate the changes from the newly generated code to create a new ultimate version of the generated code, such as version 230 in FIG. 2. Additionally, the version control module 100 can provide a notification of the detected changes to a developer, and allow the developer to specify which changes to integrate into the new ultimate version of the generated code, 230. In step 844, the version control module 100 switches to the development branch 290.

In step 846, the version control module 100 integrates the ultimate version of the generated code 230 with the ultimate version of the code 220. Because the version control module 100 is only integrating the latest changes which are typically small differences, computer generated code on branch 280 only infrequently interferes with the customizations that were made by developers on the development branch 290. Step 848 is optional, and is performed when the code generation module 110 changes the same lines of code as a developer. In that case, the version control module 100 provides a notification to the developer to resolve the conflict. Steps 828 through 848 can be repeated indefinitely.

Code in production will experience redesigns and sometimes complete re-architecture. If the architecture or design changes, the difference between two versions of code is bigger, and there is more chance of integration conflicts that will need to be reconciled. Integration conflicts are reconciled using the version control module 100, and the code development can move forward, which is why the system described here is valuable and infinitely reusable.

Figure 9:
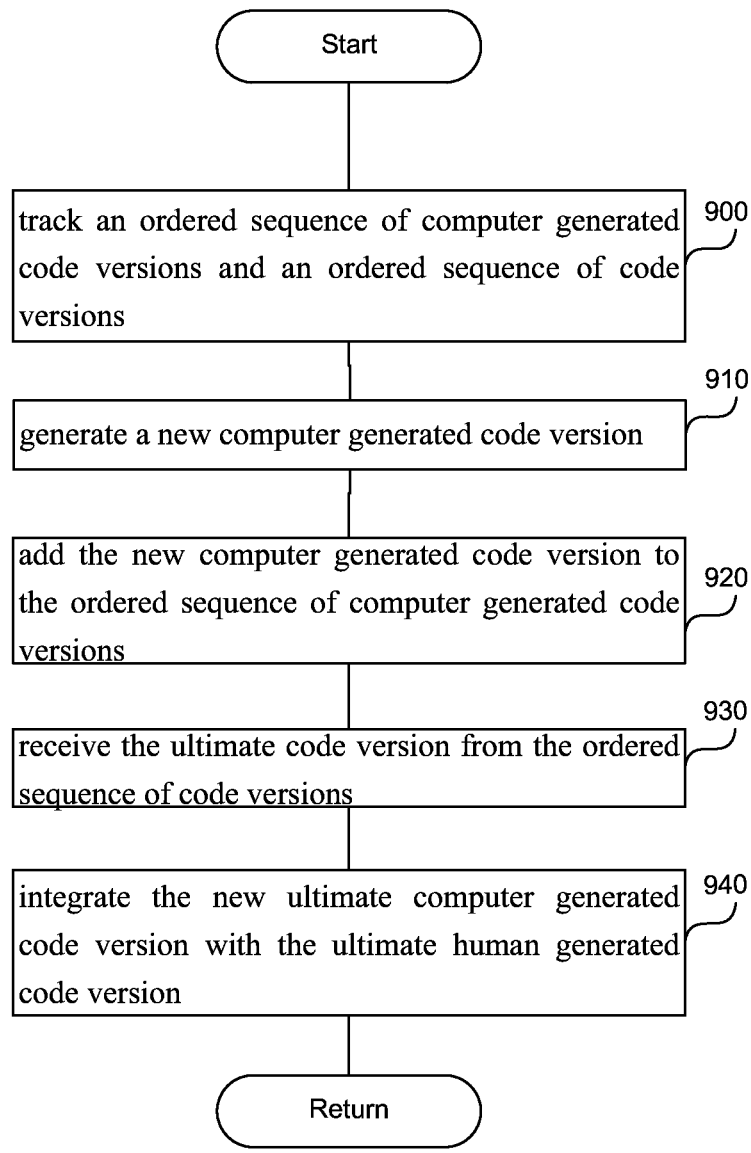
FIG. 9 is a flowchart of a method to automatically generate a source code, according to one embodiment.

FIG. 9 is a flowchart of a method to automatically generate a source code, according to one embodiment. In step 900, the version control module 100 in FIG. 1, tracks an ordered sequence of computer generated code versions, such as generator branch 280 in FIG. 2, and an ordered sequence of human generated code versions, such as development branch 290 in FIG. 2. A human generated code version in the ordered sequence of human generated code versions includes at least a human generated code. An integration of the ultimate computer generated code version, such as version 260 in FIG. 2 and the ultimate human generated code version, such as version 250 in FIG. 2 forms a new ultimate human generated code version, such as human generated code version 270 in FIG. 2. The integration of human generated code version 260 and human generated code version 250, can be arbitrary, that is, there are no areas for custom code in computer generated code version 260, and there are no inheritance areas, and/or classes for custom code.

To track the ordered sequence of computer generated code versions and the ordered sequence of human generated code versions in step 900, the version control module 100 in FIG. 1 creates a version control branch, i.e., generator branch 280 in FIG. 2, associated with computer generated code, and a version control branch, i.e., development branch 290 in FIG. 2, associated with the code. The generator branch 280 includes the ordered sequence of computer generated code versions, such as versions 200, 230, 260 in FIG. 2. The development branch 290 includes the ordered sequence of an ordered sequence of human generated code versions, such as versions 210, 220, 240, 250, 270 in FIG. 2. As described in FIG. 4, there can be multiple feature branches 410, 420, 430 in FIG. 4, where each feature branch 410, 420, 430 contains two version control branches, one generator branch and one development branch. Each feature branch 410, 420, 430 can correspond to a feature of the source code being developed. Generally, the features are independent and modifications in the various feature branches 410, 420, 430 are made in non-overlapping files.

In step 910, the code generation module 110 in FIG. 1 generates a new computer generated code version, such as version 230 in FIG. 2. To generate the new computer generated code version, the code generation module 110 receives a specification including human readable high-level instructions. The specification is understood and written by people and can be formulated in a structured human language such as a structured English language, or can be formulated in a graphical developer interface as a graph, such as a flowchart. Based on the received specification, the code generation module 110 generates the new computer generated code version.

In step 920, the version control module 100 adds the new computer generated code version 230 to the ordered sequence of computer generated code versions 280 in FIG. 2. The new computer generated code becomes a new ultimate computer generated code. To add the new computer code, the version control module 100 determines a difference between the new computer generated code and the ultimate computer generated code 200 in FIG. 2. The version control module 100 adds the difference to the ultimate computer generated code 200 to obtain the new ultimate computer generated code 230.

In step 930, the version control module 100 receives the ultimate human generated code version from the ordered sequence of human generated code versions, such as version 220 in FIG. 2. In step 940, based on the ordered sequence of computer generated code versions 280 and the ordered sequence of human generated code versions 290, the version control module 100 can automatically integrate the new computer generated code version 230 with human generated code version 220 to generate a new ultimate code 240.

In one example, to integrate the new computer generated code in step 930, the version control module 100 identifies a location of the difference within the ultimate human generated code version. The version control module 100 compares the ultimate human generated code version with the penultimate human generated code version at the identified location. Upon determining that the ultimate human generated code version and the penultimate human generated code version match at the identified location, the version control module 100 integrates the difference from the new computer generated code into the new ultimate code.

In another example, to integrate the new computer generated code in step 930, the version control module 100 receives a file, such as file 500 in FIG. 5, containing at least a part of the new computer generated code version, such as human generated code version 230 in FIG. 2. Based on the contents of the file the version control module 100 computes a unique identifier associated with the file, such as values 550-590 in FIG. 5, and values 650-690 in FIG. 6. The computation of the values can be done using a hashing function. The version control module 100 finds a corresponding file, such as file 600 in FIG. 6, in human generated code version, such as version 220 in FIG. 2, where the file 500 and the corresponding file 600 include the same file identification. The file identification can be a unique identifier such as a name, or an alphanumerical file identification (ID). Based on contents of the corresponding file 600, the version control module 100 computes a second unique identifier associated with the corresponding file. When the first unique identifier and the second unique identifier do not match, the version control module 100 merges (i.e., integrates) the contents of the file 500 and the corresponding file 600.

To merge the contents of the file 500 and the corresponding file 600, the version control module 100 segments the file 500 and the corresponding file 600 into multiple segments, 510-540 in FIG. 5, and a plurality of corresponding segments, 610-640 in FIG. 6, respectively. Segments can be lines of code, as shown in FIGS. 5, 6, 7. The segment can correspond to a line in the file, such as lines 510-540 in FIG. 5, or lines 610-640 in FIG. 6. Based on contents of a segment in multiple segments, such as line 530 in FIG. 5, the version control module 100 computes a third unique identifier associated with the segment 530. Based on contents of a corresponding segment, such as segment 630 in FIG. 6, in the plurality of corresponding segments, the version control module 100 computes a fourth unique identifier associated with the corresponding segment 630. When the third unique identifier and the fourth unique identifier do not match, the version control module 100 selects one of the segment 530 or the corresponding segment 630 to integrate into the new ultimate human generated code version, such as 240 in FIG. 2. To make the selection, the version control module 100 can select the corresponding segment 630 associated with human generated code version 220 to integrate into the new ultimate human generated code version 240. Alternatively, to make the selection, the version control module 100 can provide a notification that the third unique identifier and the fourth unique identifier do not match, such as sending an email to the developer, displaying a window indicating that there is a conflict between two versions of code, 230, and 220.

Figure 10:
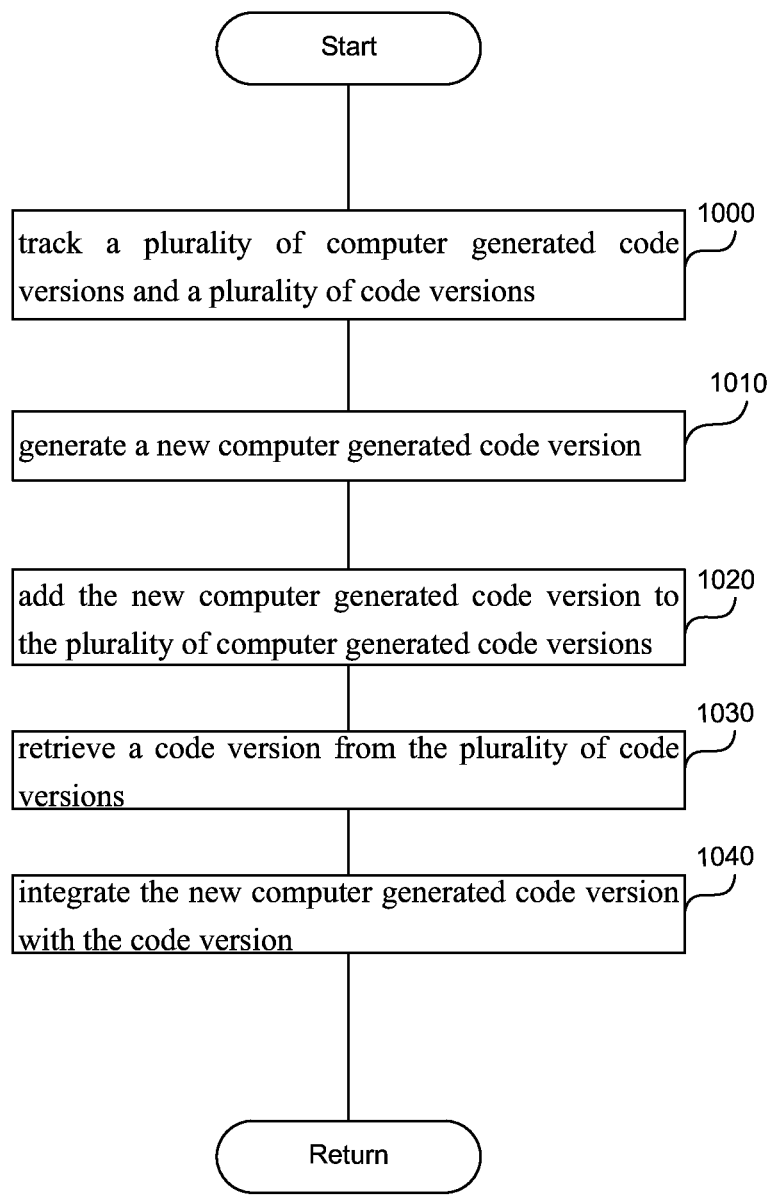
FIG. 10 is a flowchart of a method to automatically generate a source code, according to another embodiment.

FIG. 10 is a flowchart of a method to automatically generate a source code, according to another embodiment. In step 1000, the version control module 100 tracks multiple computer generated code versions and multiple human generated code versions. A human generated code version in multiple human generated code versions includes at least a human generated code. Integrating a computer generated code version in multiple computer generated code versions and a corresponding human generated code version in multiple human generated code versions forms a new human generated code version in multiple human generated code versions. As explained in this application, the integration of computer generated code and the corresponding code including human generated code is done seamlessly. The integration of computer generated code and the corresponding code can be done at arbitrary locations, and not confined to the custom code areas and an inheritance structure.

To track the plurality computer generated code versions, the version control module 100 creates a version control branch, such as generator branch 280 in FIG. 2, associated with computer generated code. The version control branch 280 includes multiple computer generated code versions, such as version 200, 230, 260 in FIG. 2. The version control module 100 creates a version control branch, such as development branch 290 in FIG. 2, associated with the code. The version control branch includes multiple human generated code versions, such as human generated code versions 210, 220, 240, 250, 270 in FIG. 2. As described in FIG. 4, there can be multiple feature branches 410, 420, 430 in FIG. 4, where each feature branch 410, 420, 430 contains two version control branches, one generator branch and one development branch. Each feature branch 410, 420, 430 can correspond to a feature of the source code being developed. Generally, the features are independent and modifications in the various feature branches 410, 420, 430 are made in non-overlapping files.

In step 1010, the code generation module 110 generates a new computer generated code version. To generate the new computer generated code version, the code generation module 110 receives a specification including human readable high-level instructions. The specification is understood and written by people and can be formulated in a structured human language such as a structured English language, or can be formulated in a graphical developer interface as a graph, or a flowchart. Based on the received specification, the code generation module 110 creates the new computer generated code version.

In step 1020, the version control module 100 adds the new computer generated code version to multiple computer generated code versions. In step 1030, the version control module 100 retrieves a human generated code version from multiple human generated code versions.

In step 1040, the version control module 100 integrates the new computer generated code version with human generated code version to generate the new human generated code version in multiple human generated code versions. To integrate the new computer generated code version with human generated code version, the version control module 100 receives a file containing at least a part of the new computer generated code version. Based on the contents of the file, the version control module 100 computes a unique identifier associated with the file. The computation can be done by hashing the contents of the file to a unique identifier, such as a unique numerical value. The version control module 100 finds a corresponding file in human generated code version. The corresponding file in the file can have the same file identification (ID). The file identification can be a file name, or a unique file ID, such as a unique alphanumeric string indicating that the two files are related. Based on contents of the corresponding file, the version control module 100 computes a second unique identifier associated with the corresponding file. When the first unique identifier and the second unique identifier do not match, the version control module 100 merges the contents of the file and the corresponding file.

To merge the contents of the files, the version control module 100 segments the file and the corresponding file into multiple segments, and corresponding multiple segments, respectively. Segments can correspond to lines in the file. In one example, the version control module 100 can compare the segment and the corresponding segment without computing the unique identifier. The version control module 100 can compare content, such as the text, of the segment and the corresponding segment and determine whether there are any differences. In another example, based on contents of a segment in multiple segments the version control module 100 computes a third unique identifier associated with the segment. Based on contents of a corresponding segment in corresponding multiple segments, the version control module 100 computes a fourth unique identifier associated with the corresponding segment. When the third unique identifier and the fourth unique identifier do not match, the version control module selects one of the segment or the corresponding segment to integrate into the new human generated code version.

To make the selection, the version control module 100 can automatically select one of the segments to integrate into the new human generated code version. In addition, the version control module 100 can provide a notification to the developer that the segment and the corresponding segment do not match. For example, the version control module 100 can provide a notification to the developer that third unique identifier and the fourth unique identifier do not match. The developer can proceed to choose which of the segments to integrate into the new human generated code version. Once the version control module 100, receives the selection from the developer, the version control module 100 integrates the selected segment into the human generated code version.

If there are changes only on one branch, either human or computer generated, that change is automatically applied to the resulting file. In the case that there are changes made to the same line both by human and code generator, the version control module 100 can automatically resolve the conflict, or the version control module 100 can send a notification about the merge conflict to the developer. After receiving the notification, the developer can then proceed to resolve the conflict by either selecting one change, or combining the two changes.

Computer

Figure 11:
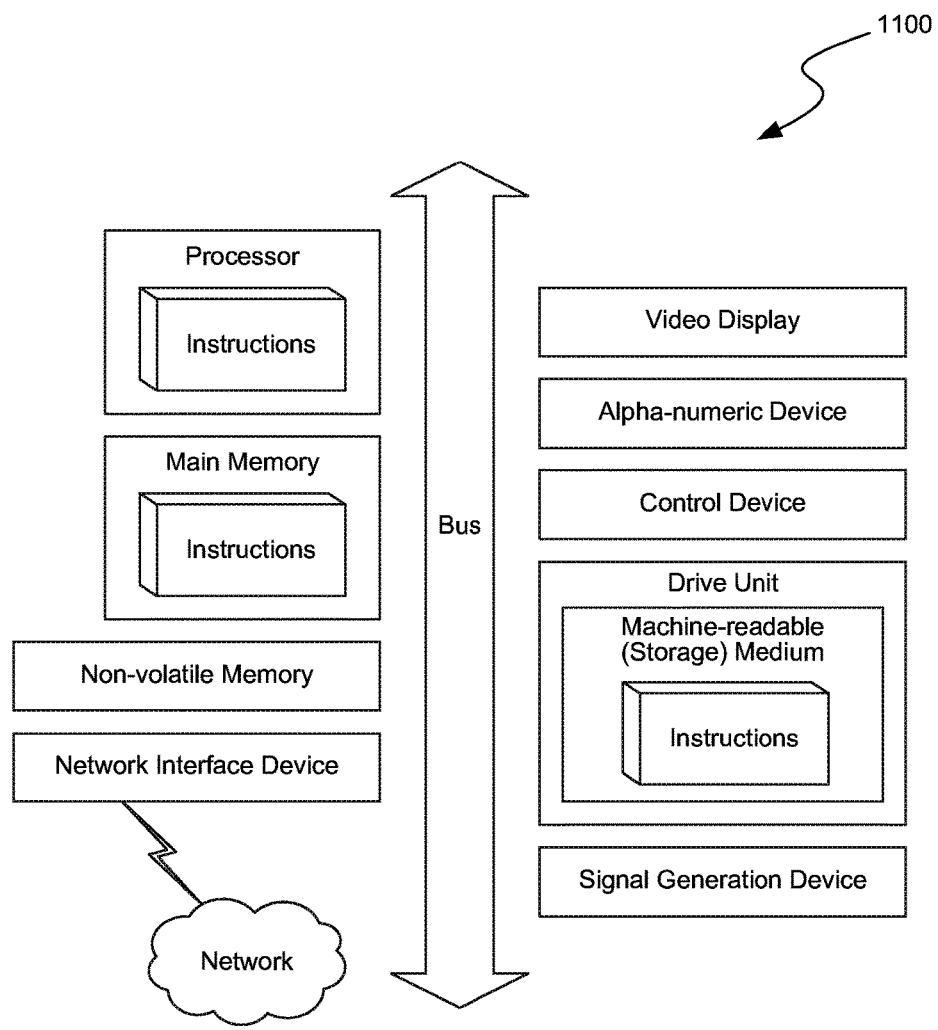
FIG. 11 is a diagrammatic representation of a machine in the example form of a computer system within which a set of instructions, for causing the machine to perform any one or more of the methodologies or modules discussed herein, may be executed.

FIG. 11 is a diagrammatic representation of a machine in the example form of a computer system 1100 within which a set of instructions, for causing the machine to perform any one or more of the methodologies or modules discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components described in the example of FIGS. 1-10 (and any other components described in this specification) can be implemented. The computer system 1100 can be of any applicable known or convenient type. The components of the computer system 1100 can be coupled together via a bus or through some other known or convenient device.

The version control module 100, and the code generation module 110 can be implemented on the processor in FIG. 11. The various version control branches, such as branches 280, 290 in FIG. 2 can be stored in the nonvolatile memory in FIG. 11, or in a database, with which the processor in FIG. 11 communicates over the network shown in FIG. 11.

This disclosure contemplates the computer system 1100 taking any suitable physical form. As an example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or 30 more of these. Where appropriate, computer system 1100 may include one or more computer systems 1100; be unitary or distributed; span multiple locations; span multiple machines; or reside in a cloud, which may include one or more cloud components in one or more networks. Where appropriate, one or more computer systems 1100 may perform without substantial spatial or temporal limitation, one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic in the file 500 RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the Computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines to implement the embodiments of the disclosure, may be implemented as part of an operating system or a specific application, component, program, object, module or sequence of instructions referred to as "source code." The source code typically comprise one or more instructions set at various times in various memory and storage devices in a computer, and that, when transformed into a computer program, read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to automatically generate a source code comprising:
    tracking an ordered sequence of computer generated code versions and an ordered sequence of human generated code versions, wherein a computer generated code version in the ordered sequence of computer generated code versions comprises a computer generated code, wherein a human generated code version in the ordered sequence of human generated code versions comprises at least a human generated code, and wherein an integration of an ultimate computer generated code version in the ordered sequence of computer generated code versions and an ultimate human generated code version in the ordered sequence of human generated code versions forms a new ultimate human generated code version comprising the source code;
    generating a new computer generated code;
    adding the new computer generated code to the ordered sequence of computer generated code versions, wherein the new computer generated code becomes a new ultimate computer generated code version;
    receiving the ultimate human generated code version from the ordered sequence of human generated code versions; and based on the ordered sequence of computer generated code versions and the ordered sequence of human generated code versions, integrating the new ultimate computer generated code version with the ultimate human generated code version to generate a new ultimate code, wherein the new ultimate code becomes the new ultimate human generated code version.

2. The method of claim 1, said adding the new computer generated code comprising:
determining a difference between the new computer generated code and the ultimate computer generated code version; and
adding the difference to the ultimate computer generated code version to obtain the new ultimate computer generated code version.

3. The method of claim 2, said integrating the new computer generated code comprising:
identifying a location of the difference within the ultimate human generated code version;
comparing the ultimate human generated code version with a penultimate human generated code version at the identified location; and
upon determining that there is no difference between the ultimate human generated code version and the penultimate human generated code version at the identified location, integrating the difference from the new computer generated code into the new ultimate human generated code version.

4. The method of claim 1, said tracking the ordered sequence of computer generated code versions and the ordered sequence of human generated code versions comprising:
creating a first version control branch associated with the computer generated code, wherein the first version control branch comprises the ordered sequence of computer generated code versions; and
creating a second version control branch associated with the human generated code, wherein the second version control branch comprises the ordered sequence of human generated code versions.

5. The method of claim 1, said generating the new computer generated code comprising:
receiving a specification comprising human readable high-level instructions;
based on the received specification generating the new computer generated code.

6. The method of claim 1, said integrating the new ultimate computer generated code version with the human generated code version comprising:
receiving a file containing at least a part of the new ultimate computer generated code version;
finding a corresponding file in the human generated code version, wherein the file and the corresponding file comprise the same file identification;
comparing contents of the file and the corresponding file; and
when the contents of the file and the corresponding file do not match, merging the contents of the file and the corresponding file.

7. The method of claim 6, said merging the contents comprising:
segmenting the file and the corresponding file into a plurality of segments and a plurality of corresponding segments, respectively;
when the contents of a segment in the plurality of segments and a corresponding segment in the plurality of corresponding segments do not match, selecting one of the segment or the corresponding segment to integrate into the new ultimate human generated code version.

8. The method of claim 7, said selecting comprising automatically selecting the corresponding segment associated with the human generated code version to integrate into the new ultimate human generated code version.

9. The method of claim 7, said selecting comprising providing a notification that the contents of the segment and the corresponding segment do not match.

10. A method comprising:
tracking a plurality of computer generated code versions and a plurality of human generated code versions, wherein a computer generated code version in the plurality of computer generated code versions comprises a computer generated code, wherein a human generated code version in the plurality of human generated code versions comprises at least a human generated code, and wherein an integration of the computer generated code version in the plurality of computer generated code versions and a corresponding human generated code version in the plurality of human generated code versions form a new human generated code version in the plurality of human generated code versions;
generating a new computer generated code;
adding the new computer generated code to the plurality of computer generated code versions;
retrieving the human generated code version from the plurality of human generated code versions; and
integrating the new computer generated code with the corresponding human generated code version to generate the new human generated code version in the plurality of human generated code versions.

11. The method of claim 10, said tracking the plurality of computer generated code versions comprising and the plurality of human generated code versions comprising:
creating a first version control branch associated with the computer generated code, wherein the first version control branch comprises the plurality of computer generated code versions; and
creating a second version control branch associated with the human generated code, wherein the second version control branch comprises the plurality of human generated code versions.

12. The method of claim 10, said generating the new computer generated code comprising:
receiving a specification comprising human readable high-level instructions; and
based on the received specification generating the new computer generated code.

13. The method of claim 10, said integrating the new computer generated code with the corresponding human generated code version comprising:
receiving a file containing at least a part of the new computer generated code;
finding a corresponding file in the human generated code version;
comparing the file and the corresponding file; and
when contents of the file and the corresponding file do not match, merging the contents of the file and the corresponding file.

14. The method of claim 13, said merging the contents comprising:
segmenting the file and the corresponding file into a plurality of segments and a plurality of corresponding segments, respectively; and when the contents of a segment in the plurality of segments and a corresponding segment in the plurality of corresponding segments do not match selecting one of the segment or the corresponding segment to integrate into the new human generated code version in the plurality of human generated code versions.

15. The method of claim 14, said selecting comprising automatically selecting the corresponding segment associated with the human generated code version to integrate into the new human generated code version in the plurality of human generated code versions.

16. The method of claim 14, said selecting comprising providing a notification that the file and the corresponding file do not match.

17. A system comprising:
a version control module to track an ordered sequence of computer generated code versions and an ordered sequence of human generated code versions, wherein a computer generated code version in the ordered sequence of computer generated code versions comprises a computer generated code, wherein a human generated code version in the ordered sequence of human generated code versions comprises at least a human generated code, and wherein an integration of an ultimate computer generated code version in the ordered sequence of computer generated code versions and an ultimate human generated code version in the ordered sequence of human generated code versions forms a new ultimate human generated code version;
a code generation module to generate a new computer generated code;
the version control module to add the new computer generated code to the ordered sequence of computer generated code versions, wherein the new computer generated code becomes a new ultimate computer generated code version;
the version control module to receive the ultimate human generated code version from the ordered sequence of human generated code versions; and
based on the ordered sequence of computer generated code versions and the ordered sequence of human generated code versions, the version control module to integrate the new ultimate computer generated code version with the human generated code version to generate a new ultimate code comprising the new ultimate human generated code version.

18. The system of claim 17, said integrating the new computer generated code comprising:
the version control module to determine a difference between the new computer generated code and the ultimate computer generated code version;
the version control module to identify a location of the difference within the ultimate human generated code version;
the version control module to compare the ultimate human generated code version with a penultimate human generated code version at the identified location; and
upon determining that the ultimate human generated code version and a penultimate human generated code version match at the identified location, the version control module to integrate the difference from the new computer generated code into the new ultimate code.

19. The system of claim 17, comprising:
a first version control branch associated with the computer generated code, wherein the first version control branch comprises the ordered sequence of computer generated code versions; and
a second version control branch associated with the human generated code, wherein the second version control branch comprises the ordered sequence of human generated code versions.

20. The system of claim 17, the version control module to integrate the new ultimate computer generated code version with the human generated code version comprising:
the version control module to receive a file containing at least a part of the new ultimate computer generated code version;
the version control module to find a corresponding file in the human generated code version;
the version control module to compare contents of the file and the corresponding file; and
when the contents of the file and the corresponding file do not match, the version control module to integrate the contents of the file and the corresponding file.

* * * * *